United States Patent
Michaelis (10) Patent No.: US 9,604,542 B2
(45) Date of Patent: Mar. 28, 2017

(54) I/O DEVICE FOR A VEHICLE AND METHOD FOR INTERACTING WITH AN I/O DEVICE

(75) Inventor: Oliver Michaelis, San Diego, CA (US)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 685 days.

(21) Appl. No.: 13/090,865

(22) Filed: Apr. 20, 2011

(65) Prior Publication Data

US 2012/0272193 A1    Oct. 25, 2012

(51) Int. Cl.
G06F 3/0488    (2013.01)
B60K 37/06    (2006.01)

(52) U.S. Cl.
CPC ............ B60K 37/06 (2013.01); G06F 3/0488 (2013.01); B60K 2350/1028 (2013.01); B60K 2350/1068 (2013.01)

(58) Field of Classification Search
CPC ............ B60K 37/06; B60K 2350/1068; B60K 2350/1028; B60K 2350/928; B60K 2350/1004; G06F 3/03547; G06F 3/0488; G06F 3/0412; G06F 3/04883; G06F 2203/04808; G06F 3/04886; G06F 3/0482; G06F 3/04817; G02B 27/01
USPC ........................................................ 715/863
See application file for complete search history.

(56) References Cited

U.S. PATENT DOCUMENTS

2004/0122572 A1    6/2004    Ichinose
2006/0026521 A1*   2/2006    Hotelling et al. ............ 715/702
2006/0047386 A1*   3/2006    Kanevsky et al. ............... 701/36
2007/0177803 A1*   8/2007    Elias et al. ..................... 382/188
2010/0093399 A1*   4/2010    Kim et al. ..................... 455/566
2010/0182247 A1*   7/2010    Petschnigg ........... G06F 1/1647
                                                  345/173
2010/0235118 A1*   9/2010    Moore ................. G06F 3/04883
                                                  702/57
2010/0250801 A1*   9/2010    Sangster ............... G06F 9/4443
                                                  710/73

(Continued)

FOREIGN PATENT DOCUMENTS

DE    102009036371 A1    4/2011

OTHER PUBLICATIONS

Pfeiffer et al. A Multi-Touch Enabled Steering Wheel—Exploring the Design Space. CHI 2010, Apr. 10-15, 2010, Atlanta, Georgia, USA, pp. 3355-3360.*

(Continued)

Primary Examiner — Amy M Levy
(74) Attorney, Agent, or Firm — WRB-IP LLP (57) ABSTRACT

An I/O device for a vehicle includes at least one touch-sensitive I/O display unit DT, at least one output display unit DI and a control unit CU connecting the I/O display unit DT and the output display unit DI with an information exchange unit IEU. The touch-sensitive I/O display unit DT is located in a readily reachable position for a driver and the output display unit DI is located in a readily discernible position for a driver, and the control unit CU communicates output data DD-I/O related to an interactive I/O communication to the I/O display unit DT, receives touchscreen input data TI from the I/O display unit DT and communicates output data DD-O to the output display unit DI in relation with the input data TI. An I/O method using the above mentioned I/O device for a vehicle is also provided.

22 Claims, 5 Drawing Sheets

(56) References Cited

U.S. PATENT DOCUMENTS

2011/0040455 A1* 2/2011 Lathrop et al. ................ 701/48
2011/0043468 A1* 2/2011 Lathrop et al. ............... 345/173
2011/0163966 A1* 7/2011 Chaudhri .............. G06F 3/0488
                                                                345/173
2011/0169750 A1* 7/2011 Pivonka et al. .............. 345/173

OTHER PUBLICATIONS

International Search Report (Oct. 5, 2012) for corresponding International Application PCT/EP2012/057211.
International Preliminary Report on Patentability (Jun. 1, 2013) for corresponding International Application PCT/EP2012/057211.

* cited by examiner

I/O DEVICE FOR A VEHICLE AND METHOD FOR INTERACTING WITH AN I/O DEVICE

BACKGROUND AND SUMMARY

The present invention relates to a method and a device for a human-machine interface in a vehicle.

Since touch-based user interfaces are becoming more and more prominent in many electronic consumer devices, consumers expect the intuitive model of a touch-based and gesture-based interface in more and more environments. In the automotive sector, specifically the use of touch interfaces presents some challenges due to the physical constraints of an in-vehicle environment and the special requirements to avoid driver distraction.

Interior vehicle designs have for some time separated the display of information from the user input mechanisms. While typical display locations within the vehicle are the instrument cluster or centrally located multi-function displays, the input mechanisms are distributed in readily reachable areas while driving, e.g. at the steering wheel or on the lower center console. Touch-based interfaces traditionally combine the input area directly with the display, however, the ideal position for a display (mainly determined by being close to the driver's regular road view angle) is not easy to reach. Hence, solutions have been proposed to use two separate displays, one of them being touch-enabled and within easy reach.

This invention introduces methods to integrate multi-display and touch-based interfaces in a vehicle-adapted way such that driving security is enhanced and Input/Output ("I/O")-handling becomes easier.

In a first aspect, an I/O device for a vehicle is proposed, comprising at least one touch-sensitive I/O display unit DT, at least one output display unit DI and a control unit CU connecting said I/O display unit DT and said output display unit DI with an information exchange unit IEU. Said touch-sensitive I/O display unit DT is located in a readily reachable position for a driver and the output display unit DI is located in a readily discernible position for a driver. Said control unit CU communicates output data DD-I/O related to an interactive I/O communication to said I/O display unit DT, receives input touchscreen data TI from said I/O display unit DT and communicates output data DD-O to said output display unit DI in relation with said input data TI. The invention proposes the use of touch-based user inputs within an in-vehicle dual-display system, wherein one display is also able to receive touch inputs DT, and a second informational display DI. The DT is located in an area being easily accessible in a normal driving position, whereas the DI is located within or close to the viewing angle of the driver observing the road ahead. Information displayed by the output display unit DI can also be displayed by the touch-sensitive I/O display unit DT and can be manipulated, or a process relating to said information can be triggered by tapping onto said display unit DT. The control unit CU coordinates the display of information DD-I/O by the display unit DT and information DD-O by the display unit DI. The input data TI generated by tapping on a touch-sensitive area ST of the display unit DT is communicated to the control unit CU. The input data TI and the data for the output of the DD-O and/or the DD-I/O are communicated by the control unit CU to an information exchange unit IEU, which can be a multimedia and entertainment center, a board computer, a wireless communication unit, such as a cellular phone, a navigation system or a combination thereof. Functions displayed by the DI and the DT and actions triggered by the ST can comprise the control of an audio source or a video source, such as a radio, a CD, a DVD, a multimedia system, such as a volume control, a radio station change, a track change, selecting video output; control of vehicle functions, such as low/high beam lights on/off, activation of turn light, display of temperature, compass, fuel consumption, clock etc.; the control of a navigation system, the control of a cellular phone, SMS or email-system and various other functions. Depending on the displayed information on the DI, the DT can display control elements such that a user can trigger actions by tapping on a touch-sensitive area of the DT associated with said information displayed on the DI and/or with said control element displayed on the DT. The vehicle can be a car, a van, a truck, a motorcycle or a bike. It is also advantageous to integrate said I/O device in a boat, preferably in a motor boat, or in an aeroplane or the like.

According to an advantageous embodiment, said touch-sensitive I/O display unit DT can comprise a touch-sensitive area ST covering a subpart and/or extending beyond the display area of said display unit DT. In general, the touch-sensitive area can cover the whole display region of the display unit DT. Alternatively, the ST can cover a subpart of the DT or can extend beyond the display area of the DT. The thusly extending part can be used as a static touch area associated with predefined functions. The effective touch-sensitive area can be larger than the display area of the DT such that information can be displayed on the DT without being masked by a user's hand. A subpart of the display area can be exclusively reserved for displaying data and cannot be touched by a user.

According to an advantageous embodiment, said touch-sensitive area ST of said touch-sensitive I/O display unit DT can be a multiple-point-of-contact-sensitive area. A multiple-point-of-contact-sensitive area can sense a multiple-point touch gesture and can interpret a relative movement of two or more fingers as an enhanced user command with a variety of input information. For example a movement of two fingers apart or together can be interpreted as increasing or reducing the magnitude of a command value.

According to an advantageous embodiment, said touch-sensitive I/O display unit DT can be arranged in the center console and/or in the steering wheel of said vehicle. The center console is a typical location for arranging input devices which are operated by a user and are typically reserved for a car stereo system or a navigation system. A driver can touch a touch-sensitive area with one hand by reaching the center console while operating the steering wheel with the other hand. Arranging said display unit DT in the steering wheel further increases driving safety, since both hands of a driver can remain on the steering wheel while tapping on the display unit DT. The display unit DT advantageously can be arranged on or in the vicinity of the outer periphery of the steering wheel such that a driver's hands can remain on the steering wheel while tapping onto the display unit DT.

In general output display unit DI can be arranged anywhere in the vehicle, where it can be watched easily from a driver's position. According to an advantageous embodiment, said output display unit DI can be arranged in the dashboard, instrument board and/or in a rear-view mirror and/or in a steering wheel of said vehicle. Thus, a driver can visualize the display unit DI and the oncoming traffic simultaneously without oncoming distraction which further enhances driving safety. DI can be arranged anywhere in the dashboard, i.e. even in an area which is not originally designed for arranging a display unit. DI can comprise a flexible display area which can be adapted to curved, rounded and rigidly formed portions of said dashboard.

According to an advantageous embodiment, said output display unit DI comprises at least one touch-sensitive sub-area ST-O for inputting data. A user can input data or can activate a control element by directly touching the display unit DI which can be advantageously employed for rarely used control functions, such as setting a clock, resetting the mileage counter or other basic setting functions. It is also conceivable that the touch sensitive area ST-O can cover the whole display area of said output display unit DI.

According to an advantageous embodiment, said output display unit DI can be a head-up display (HUD). A head-up display is a transparent display that represents data without requiring users to turn their eyes away from usual viewpoints. Information can be displayed on the display unit DI in a typical driving field of view, such that a driver can monitor traffic and displayed data in parallel without changing the focus of the field of view.

In another aspect of said invention a method for interacting with an I/O device for a vehicle is proposed, wherein an I/O device comprises at least one touch-sensitive I/O display unit DT, at least one output display unit DI and a control unit CU connecting said I/O display unit DT and said output display unit DI with an information exchange unit IEU. Preferably, said I/O device complies with an abovementioned embodiment. The I/O method proposes that said touch-sensitive I/O display unit DT displays textual or graphical control elements, a driver selects at least one control element by a contact gesture and said output display unit DI displays data in response to said selected control element. The invention proposes a set of touch gestures enabling the touch-based control of user interface elements on both displays DI, DT from one active touch area. The DT may display graphical elements that can be selected using single-point-of-contact gestures, e.g. tapping on an element for selection, or scrolling a list via sliding one finger. The function and behavior of the touch-sensitive area ST of the display unit DT can vary depending on the type of the control function to be manipulated, and the display unit DT can display control elements, identical information or additional information relating to the information displayed on the display unit DT. The combination of both display units DI, DT together with a touch-sensitive input area ST of the display unit DT offers an improved and intuitive control of various vehicle and communication functions with a minimized level of distraction. As a consequence, driving safety and variability of human-machine interaction is increased. The method offers new ways of interaction between user and vehicle such that an increased and variable number of functions can be displayed and controlled.

According to an advantageous embodiment of said method, said gesture can be a multi-point-of-contact gesture pertaining to one or multiple control elements. A multi-point-of-contact gesture enables inputting data with a sophisticated touch gesture such that a control element is not only selected, but content of information can also be displayed or control processes can be manipulated for selecting, zooming or changing information.

According to an advantageous embodiment of said method, said touch-sensitive I/O display unit DT can display selectable graphical and/or textual elements RDI being also displayed on said output display unit DI. A user can select said control elements RDI for manipulating functions associated with the information displayed on the DI, DT respectively. Duplicating information, spreading representation of information over both display units DI, DT and/or displaying information on the DI and related control elements for manipulating said information or triggering a related action on the display unit DT makes it easier for a user to control the information displayed on at least one of the display units by selecting and manipulating a control element RDI on the DT which is also displayed on the DI. Both display units DI, DT are logically linked via the control unit CU while offering each other optimal visibility of and access to information.

According to an advantageous embodiment of said method, the types of gesture for selecting graphical and/or textual elements can comprise tapping two or more fingers concurrently within an area pertaining to an element for selecting said element, moving two or more fingers concurrently within the area pertaining to said element for initiating a panning action related to said element, horizontally and/or vertically moving two or more fingers concurrently within an area pertaining to said element for initiating a scrolling action related to said element, moving two fingers apart or together for initiating a zoom-in or a zoom-out action related to said element. A complex two or more finger gesture not only offers the input of data by more than just selecting a control element RDI, but also manipulating its content. Thus access to information, manipulating data and triggering actions associated with said data, such as selecting an audio or a video source, establishing a telephone call, activating low/high beam light, adjusting climate control etc., can be initiated by a single gesture, reducing time and effort for using the I/O device. The aforementioned and other gestures known in the state of the art for inputting data to a touch sensitive display can be used for advantageously selecting elements on said touch screen display DT in a vehicle.

According to an advantageous embodiment of said method, a type or a set of types of gestures relates to selecting graphical and/or textual elements displayed on said touch-sensitive I/O display unit DT and a different type or set of types of gestures relates to selecting graphical and/or textual elements which can be displayed on said output display unit DI. For instance multi-point-of-contact gestures can be interpreted as inputs pertaining to graphical elements on the DI, wherein e.g. tapping with two fingers may select an element, or sliding two fingers may pan the DI's content. In this way, both display units DI, DT can display different information and a user can choose between accessing or manipulating data displayed either on the DI or the DT by using a predefined type of gesture on the touch-sensitive area ST of the display unit DT.

According to an advantageous embodiment of said method, a type of gesture for selecting a graphical and/or textual element or using a function related with said element can graphically be displayed as a visual aid on said output display unit DI when a user touches said element on said touch-sensitive I/O display unit DT. Thus, inexperienced users of the I/O display can be instructed to use types of gestures for selecting and manipulating the control elements RDI for interacting with said I/O device. In this way, human-machine interaction becomes more easier and new functions and control methods can be implemented without prior instruction of a user.

According to an advantageous embodiment of said method, an active region of said touch-sensitive area ST can be displayed on said touch-sensitive I/O display unit DT. Thus, a user can visually determine the extent of the touch-sensitive area and can distinguish between plain visual area and touch-sensitive area of DT.

BRIEF DESCRIPTION OF THE DRAWINGS

Hereinafter, the invention will be described in greater detail with reference to the attached drawings. These schematic drawings are used for illustration only and do not in any way limit the scope of the invention. In the drawings.

DETAILED DESCRIPTION

Figure 1:
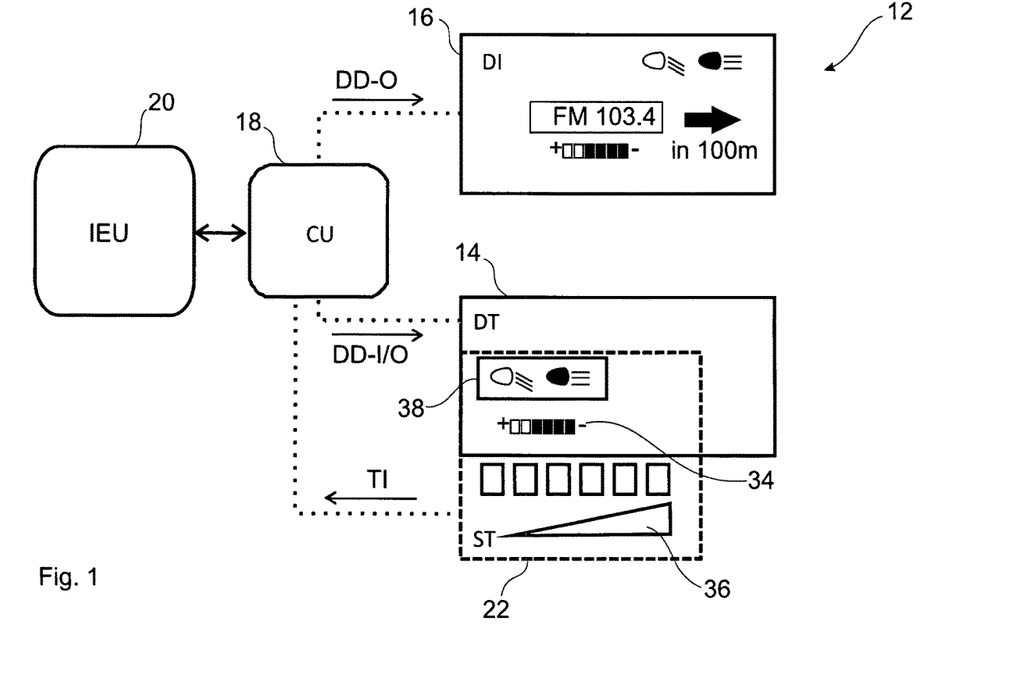
FIG. 1 schematically displays a block diagram of an I/O device according to a first embodiment of the invention.

FIG. 1 schematically displays a block diagram of a first embodiment of an I/O device 12. The I/O device 12 comprises a touch-sensitive display unit DT 14, comprising a display area and a touch-sensitive area ST 22. The touch-sensitive area ST 22 extends beyond the display area of DT 14 and is located in a readily reachable position for a driver, e.g. in a center console 24, an arm rest, a vehicle's door or a steering wheel 26 of a vehicle 10. An output display unit DI 16 is located in a typical field of view of the driver, e.g. in an instrument board 28, in a steering wheel 26 or as a head-up display 32. Located in an instrument board 28 it can replace conventional instruments, such as a speedometer or a rotation speed indicator, or can be added to or embedded in such instruments. Both display units DT 14 and DI 16 are connected with a control unit 18. The control unit 18 communicates data DD-I/O to be displayed on the display unit DT 14 and receives input data or data of the selected control elements 34, 36 TI from the touch-sensitive area ST 22 of the display unit DT 14. The control unit 18 further communicates output data DD-O to be displayed to the display unit DI 16. The control unit 18 is connected with an information exchange unit 20 providing an interface for a board computer, to a multimedia and entertainment system of the vehicle, to a communication system, such as a cellular phone, internet access or similar and/or to a navigation system. The IEU 20 receives and transmits data to said applications and commands the CU 18 to display data according to the user's preferences or requests by an application. The CU 18 informs the IEU 20 about the input of the user for performing actions related to said input, such as establishing a telephone call, start navigation, switch between different vehicle data to be displayed, activation of wiper or turning on/off light etc. The display unit DI 16 can display graphical and/or textual control elements indicating a status of a related application, such as a selected frequency of a radio channel, volume of a loudspeaker, outer temperature, status of headlights, navigation information etc. The display unit DT 14 can display some or all control elements 34 in a touch-sensitive area ST such that a user can select, activate or manipulate applications related to said control elements 34. An active region 38 of a selectable control element 34 can be displayed for informing a user of the extent of a touch-sensitive region relating to said control element 34. Furthermore, static control area elements 34 can be arranged on touch-sensitive subareas of the ST 22, which are not covered by a display area of the DT 14. Such area elements 34 can indicate fixed functions, such as an increase (+) or a decrease (−) in an element's magnitude which can be useful for inputting numbers, controlling volume or brightness etc. While tapping on such areas 36, a user does not mask display regions of the DT 14, which can indicate variable functions of said area elements 34. The display area of the DT 14 can display variable control elements 34, e.g. control elements for controlling the volume of a radio or for switching between high or low light beam.

The display DT 14 is capable of representing graphical elements 34 and is equipped with a touch-sensitive surface ST 22 that can detect a human touch on the surface with one or more fingers. The touch surface 22 may also detect touches by other materials, such as stencils. The second display unit DI 16 is capable of representing graphical elements. Based on the gesture performed on the ST 22, the input is correlated to an event pertaining to graphical elements on the DT 14, DI 16, or both. For selection of or interaction with graphical elements on the DT 14, single-point-of-contact gestures are used, e.g. tapping to select or sliding to scroll. For selection of or interaction with graphical elements on the DI 16, multiple-point-of-contact gestures are used.

One embodiment specifically defines the following embodiments:

In one embodiment, the ST 22 is equal to the DT 14, i.e. the complete display area of the DT 14 is touch-sensitive. In another embodiment, a part of the DT 14 is touch-sensitive, i.e. the ST 22 is a subarea of the DT 14. In another embodiment, the ST 22 extends beyond the display area of the DT 14, i.e. the display area of the DT 14 is completely or partially touch-sensitive, and surrounding surfaces of the DT 14 are touch-sensitive as well. In another embodiment, the DI 16 may also contain a touch-sensitive technology that can be used for the direct selection of graphical control elements 34. In one embodiment, the DT 14 may display a representation RDI 34 of the graphical elements shown on the DI, wherein two or more point-of-contact gestures are performed within the area displaying the RDI 34 to select or interact with the graphical elements of the DI 16. In this embodiment, all single-point-of-contact touch actions pertain to the selection of or interaction with graphical elements on the DT 14. A selection of or interaction with elements on the DI 16 is represented by tapping two or more fingers concurrently within the area pertaining to the RDI 34; a panning action is represented by moving two or more fingers concurrently within the area pertaining to the RDI 34; a scrolling action is represented by horizontally, respectively vertically, moving two or more fingers concurrently within the area pertaining to the RDI 34; a zoom-in/zoom-out action is represented by moving two fingers apart/together within the area pertaining to the RDI 34.

In another embodiment, the graphical elements displayed on the DT 14 and the DI 16 are not directly related, i.e. are not representative of each other. The DT 14 may or may not explicitly mark the active area 38 of the ST 22.

In this embodiment, all single-point-of-contact touch actions pertain to the selection of or the interaction with graphical elements on the DT 14. A selection of or interaction with elements on the DI 16 is represented by tapping one or two or more fingers within the ST 22; a panning action is represented by moving two or more fingers concurrently; a scrolling action is represented by horizontally, respectively vertically, moving two or more fingers concurrently; a zoom-in/zoom-out action is represented by moving two fingers concurrently apart/together.

To aid a user in the selection of graphical elements 34 on the DI 16 while performing gestures on the ST 22, a visual aid, such as a cursor, may be displayed when a multi-touch event is detected for the duration of the contact. For example when the user touches the ST 22 with two fingers to select an element on the DI 16, a visual token, such as a cursor, appears in the center of the display DT 14 or DI 16, and moves with the user's fingers. To select the element under the cursor, the user removes and replaces one of the two fingers from the ST, while the second or remaining finger(s) remain on the ST. The initial placement of the cursor upon detection of a selection gesture may also be context-driven, i.e. above the element being most likely to be relevant for the current user interaction (e.g. first element in a list).

Figure 2:
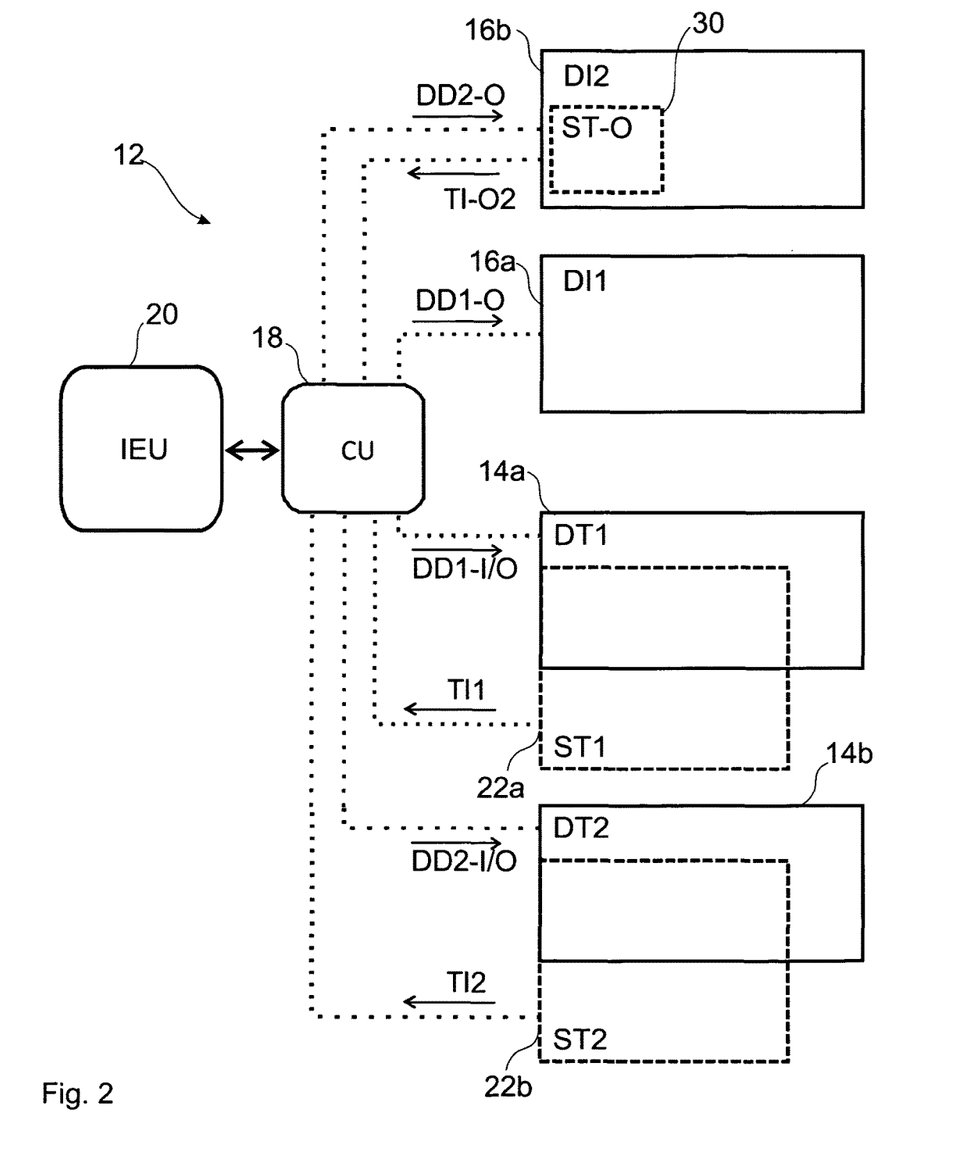
FIG. 2 schematically displays a block diagram of an I/O device according to another embodiment of the invention.

FIG. 2 displays a further block diagram of another embodiment of an I/O device 12, which is based on the structure of the I/O device 12 of FIG. 1. In contrast to FIG. 1, the I/O device of FIG. 2 comprises two touch-sensitive output display units DT1 14a and DT2 14b, each display unit can comprise a touch-sensitive area ST1 22a and ST2 22b. The control unit 18 is connected with either of both display units DT 14a, 14b for communicating the data DD1-I/O, DD2-I/O for displaying data and for receiving user input data TI1, T12. A user can use either the DT1 14a or the DT2 14b for selection or manipulation of control elements, which can depend on an easy access of said display due to a driving or parking situation. For instance the display unit DT1 14a can be located in a steering wheel 26 and the display unit DT2 can be arranged in a center console 24. The control unit 18 is connected with an information exchange unit IEU 20 and with two output display units DI1 16a and DI2 16b. Both output displays can display output data DD1-O, DD2-O respectively. The output display unit DI2 16b comprises a touch-sensitive area ST-O 30 and also communicates input data TI-O2 to the control unit 18. The touch-sensitive area ST-O 30 can be used for manipulating settings of rarely used functions, such as resetting the daily mileage counter, clock setting, language, unit selection or similar functions.

Figure 3:
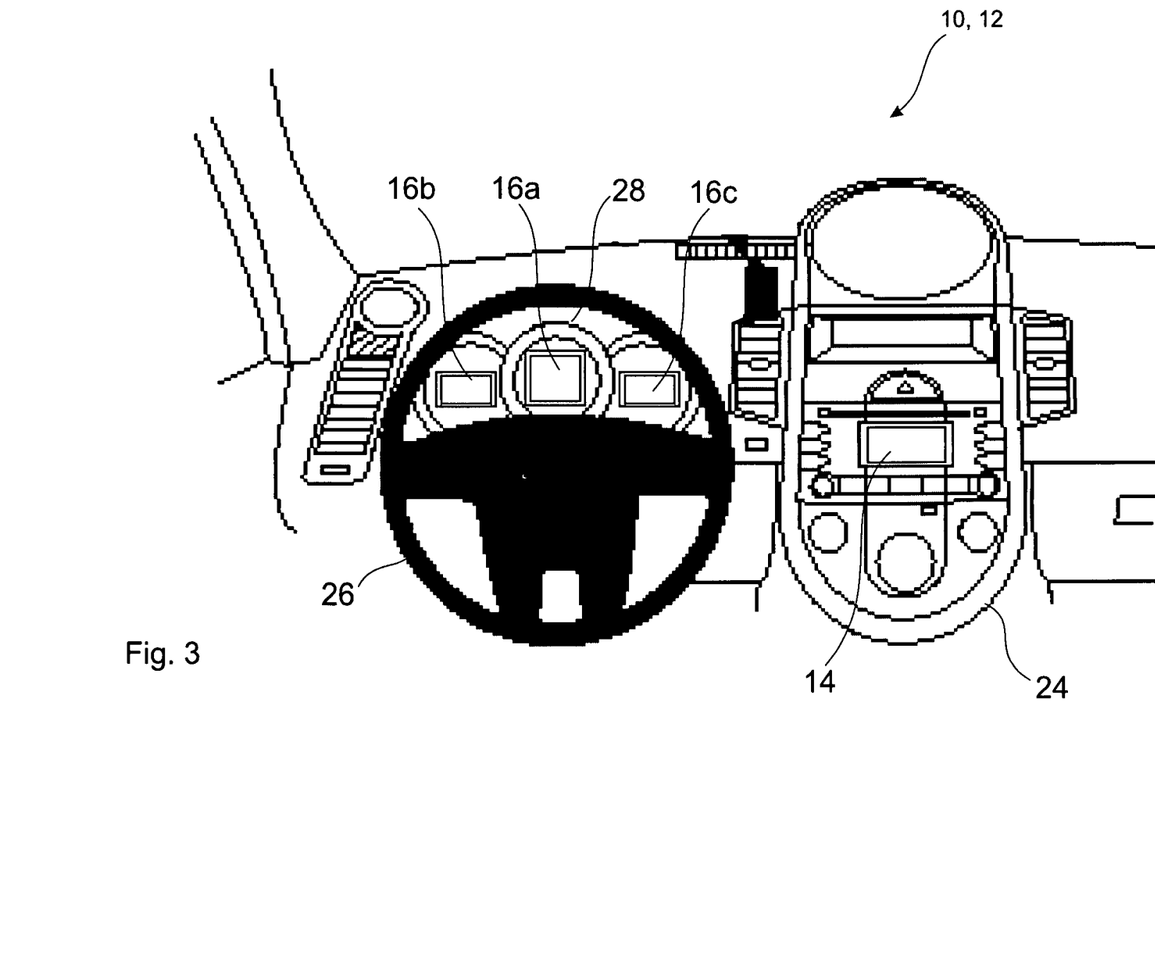
FIG. 3 schematically displays an I/O device inside a car according to another embodiment of the invention.

FIG. 3 schematically displays an interior of a vehicle 10 with a steering wheel 26, a center console 24 and an instrument board 28. The instrument board 28 comprises multiple analogous instruments, such as a speedometer, a fuel indicator or similar. The speedometer DI16a, a clock DI 16b and a rotation speed indicator DI 16c each comprise an output display unit DI 16 for displaying additional or digital data of the analogous instrument and further information, such as mileage counting, average fuel consumption, outer temperature and similar data. Furthermore, the centrally located output display unit DI 16a can also display navigation system data, audio system information and details concerning incoming and outgoing telephone calls. The navigation system, audio system, mobile phone, internet access and further displayed data can be controlled by a touch-sensitive output device DT 14 arranged in a center console 24 of said vehicle 10. A driver with the right hand can comfortably operate the I/O display unit DT 14 and can monitor the data displayed on the display units DI 16a, 16b and 16c in the instrument board 28.

Figure 4:
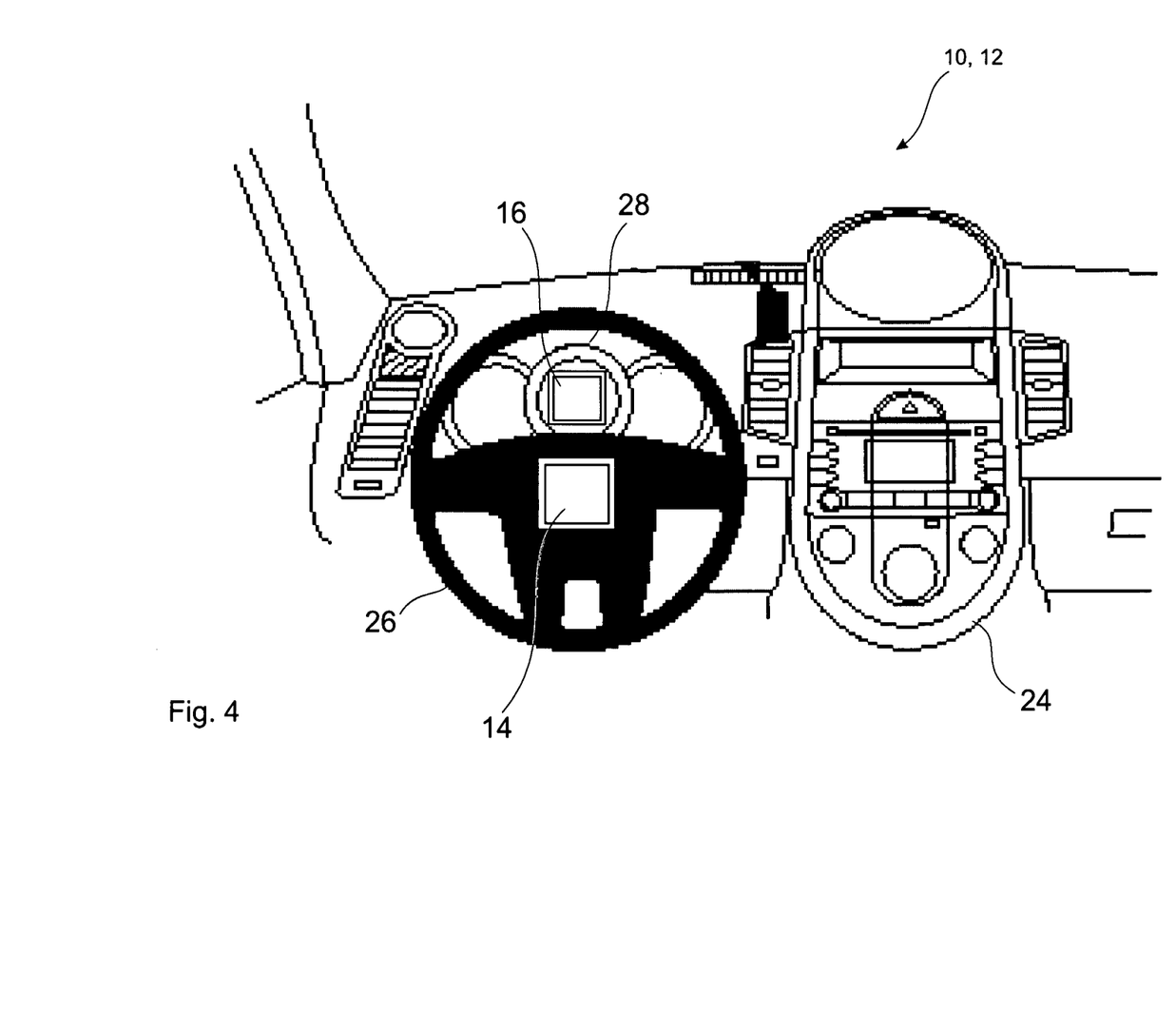
FIG. 4 schematically displays an I/O device inside a car according to another embodiment of the invention.

FIG. 4 displays a similar embodiment of an I/O device 12 as that of FIG. 3 of an interior of a vehicle 10. In contrast to the embodiment 12 of FIG. 3, the I/O display unit DT 14 is arranged in the steering wheel 26 such that a driver can touch a touch-sensitive area ST of the display unit DT 14 while leaving at least one hand at the steering wheel 26 thus enhancing driving safety. An output display unit DI 16 is arranged in a centrally located instrument of the instrument board 28.

Figure 5:
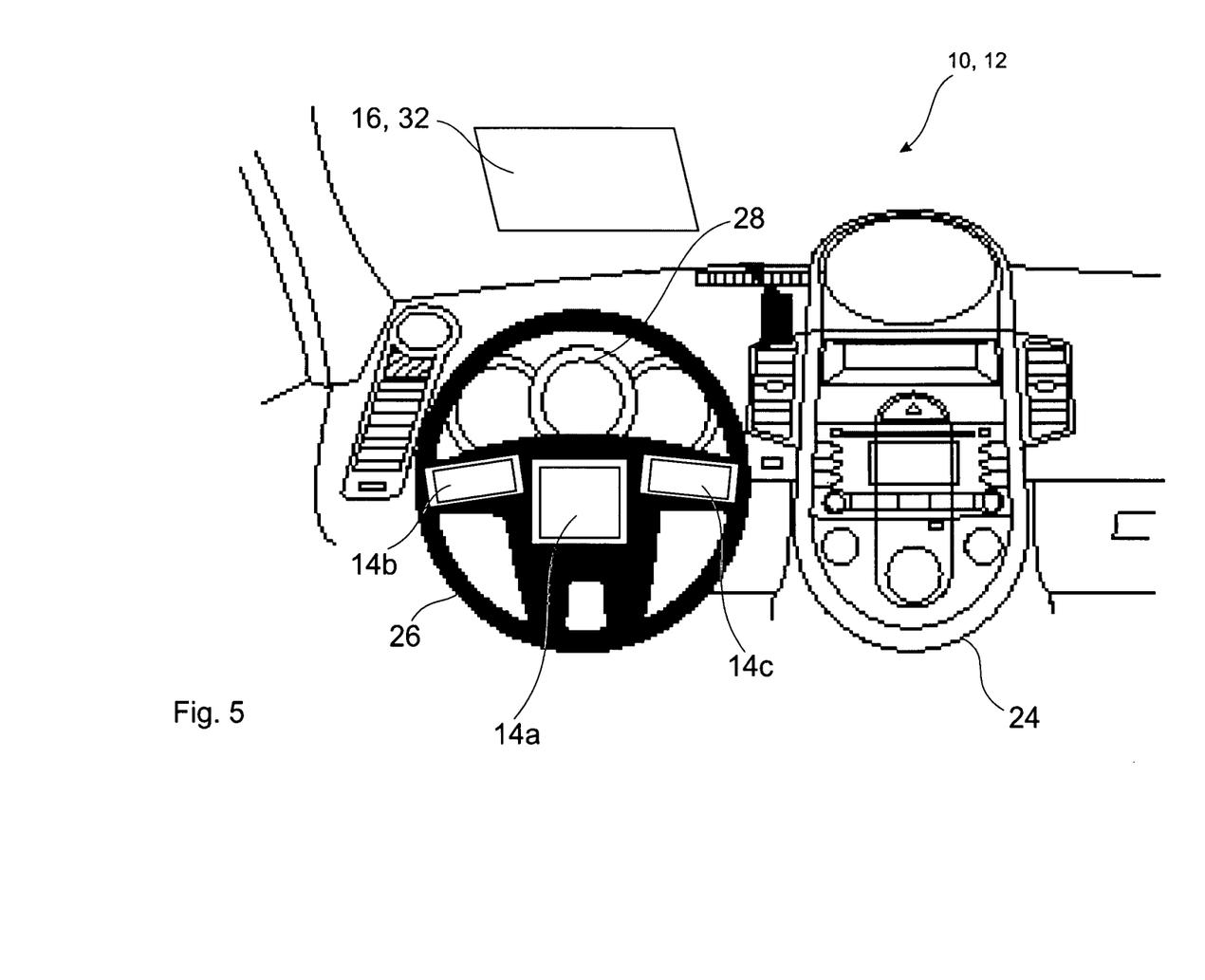
FIG. 5 schematically displays an I/O device inside a car according to another embodiment of the invention.

Finally, FIG. 5 depicts another embodiment of an I/O device 12 comprising three I/O display units DT 14a, 14b and 14c arranged in a steering wheel 26. The I/O display units DT 14a, 14b are peripherally arranged so that they can be touched by a thumb of a hand of a driver and a larger I/O display unit DT 14a is arranged in the center of the steering wheel 26 for alphanumerical input and visualization of more detailed data. An output display DI 16 is configured as a head-up display 32 (HUD) and projects the output picture onto a semi-reflective surface of an inner windscreen side such that a driver can simultaneously keep track of the data of the output display unit 16 and the traffic situation ahead.

The present invention is not limited to the above examples, but may be varied freely within the scope of the appended claims.

REFERENCE NUMERALS 10 vehicle
12 I/O Device (12)
14 touch sensitive I/O display unit DT
16 output display unit DI
18 control unit CU
20 information exchange unit IEU
22 touch-sensitive area ST
24 center console
26 steering wheel
28 instrument board
30 touch-sensitive subarea ST-O
32 head-up display
34 graphical and/or textual control elements RDI
36 predefined touch sensitive areas
38 active region of an element

The invention claimed is:

1. An Input/Output (I/O) device for a vehicle comprising
at least one touch-sensitive I/O display unit comprising a first display unit,
at least one output display unit comprising a second display unit, and
a control unit connecting the I/O display unit and the output display unit with an information exchange unit,
wherein the touch-sensitive I/O display unit is located in a readily reachable position for a user and the output display unit is located in a readily discernible position for the user, and the control unit is configured to communicate output data related to an interactive I/O communication to the I/O display unit, receive input data from the I/O display unit and communicate output data to the output display unit in relation with the input data,
wherein both the first and second display units can selectively display information that is not displayed on the other one of the first and second display units or information that is the same as information displayed on the other one of the first and second display units, and the touch-sensitive I/O display, the output display unit, the control unit, and the information exchange unit are configured so that information displayed on the output display can only be accessed or manipulated by a first kind of contact gesture from the user on the touch-sensitive area of the touch-sensitive I/O display unit, and information displayed on the touch-sensitive I/O display unit can only be accessed or manipulated by using a second kind of contact gesture different from the first kind of contact gesture on the touch-sensitive area of the touch-sensitive I/O display unit, and wherein the first type of contact gesture for accessing or manipulating data displayed on the output display is a multi-point-of-contact gesture from the user on the touch-sensitive area of the touch-sensitive I/O display unit, and the second type of contact gesture for accessing or manipulating data displayed on the touch-sensitive I/O display unit is a single-point-of contact gesture on the touch-sensitive area of the touch-sensitive I/O display unit.

2. The device according to claim 1, wherein the touch-sensitive I/O display unit comprises a further touch-sensitive area covering a subpart and/or extending beyond the display area of the display unit.

3. The device according to claim 1, wherein the touch-sensitive I/O display unit is arranged in the center console and/or in the steering wheel of the vehicle.

4. The device according to claim 1, wherein the output display unit is arranged in at least one of the dashboard, instrument board, a rear-view mirror, a steering wheel of the vehicle.

5. The device according to claim 1, wherein the output display unit comprises at least one touch-sensitive subarea for inputting data.

6. The device according to claim 1, wherein the output display unit is a head-up display.

7. The device according to claim 1, wherein the touch-sensitive I/O display, the output display unit, the control unit, and the information exchange unit are configured to permit a user to duplicate information on one of the first and second display units on the other of the first and second display units.

8. The device according to claim 1, wherein the touch-sensitive I/O display, the output display unit, the control unit, and the information exchange unit are configured to permit a user to spread representation of information over the first and second display units.

9. The device according to claim 1, wherein the touch-sensitive I/O display, the output display unit, the control unit, and the information exchange unit are configured to permit a user to display information on the output display unit and on the touch-sensitive I/O display and to manipulate the information on the output display unit by an input through the touch-sensitive I/O display unit.

10. The device according to claim 1, wherein the touch-sensitive I/O display, the output display unit, the control unit, and the information exchange unit are configured to permit a user to display information on the output display unit and on the touch-sensitive I/O display and to trigger a process relating to the information on the output display unit by an input through the touch-sensitive I/O display unit.

11. The device according to claim 1, wherein the touch-sensitive I/O display, the output display unit, the control unit, and the information exchange unit are configured to permit a user to select a control element displayed on the touch-sensitive I/O display by an input through the touch-sensitive I/O display unit so that information relating to the control element is displayed on the output display unit.

12. A method for interacting with an Input/Output (I/O) device for a vehicle comprising at least one touch-sensitive I/O display unit comprising a first display unit, at least one output display unit comprising a second display unit, and a control unit connecting the I/O display unit and the output display unit with an information exchange unit, wherein the touch-sensitive I/O display unit is located in a readily reachable position for a user and the output display unit is located in a readily discernible position for the user, and the control unit is configured to communicate output data related to an interactive I/O communication to the I/O display unit, receive input data from the I/O display unit and communicate output data to the output display unit in relation with the input data, wherein both the first and second display units can selectively display information that is not displayed on the other one of the first and second display units or information that is the same as information displayed on the other one of the first and second display units, and the touch-sensitive I/O display, the output display unit, the control unit, and the information exchange unit are configured so that information displayed on the output display can only be accessed or manipulated by a first kind of contact gesture from the user on the touch-sensitive area of the touch-sensitive I/O display unit, and information displayed on the touch-sensitive I/O display unit can only be accessed or manipulated by using a second kind of contact gesture different from the first kind of contact gesture on the touch-sensitive area of the touch-sensitive I/O display unit, the method comprising:

displaying, with the touch-sensitive I/O display unit, information in a form of at least one of textual and graphical control elements,     selecting at least one of the control elements by the second kind of contact gesture from the user on the touch-sensitive area of the touch-sensitive I/O display unit,     displaying information via the output display unit in response to the selected control element,     accessing or manipulating information displayed on the output display only by the first kind of contact gesture from the user on the touch-sensitive area of the touch-sensitive I/O display unit, the first type of contact gesture being different from the second type of contact gesture, and     accessing or manipulating data displayed on the touch-sensitive I/O display unit by using the second kind of contact gesture on the touch-sensitive area of the touch-sensitive I/O display unit,     wherein the first type of contact gesture for accessing or manipulating data displayed on the output display is a multi-point-of-contact gesture from the user on the touch-sensitive area of the touch-sensitive I/O display unit, and the second type of contact gesture for accessing or manipulating data displayed on the touch-sensitive I/O display unit is a single-point-of contact gesture on the touch-sensitive area of the touch-sensitive I/O display unit.

13. The method according to claim 12, comprising displaying, with the touch-sensitive I/O display unit, selectable graphical and/or textual elements that are also displayed on the output display unit.

14. The method according to claim 12, wherein the first type of contact gesture for selecting at least one of the control elements comprises one or more of     tapping two or more fingers concurrently within an area pertaining to the at least one of the elements,     moving two or more fingers concurrently within the area pertaining to the at least one of the elements for initiating a panning action related to the at least one of the elements,     horizontally and/or vertically moving two or more fingers concurrently within the area pertaining to the at least one of the elements for initiating a scrolling action related to the at least one of the elements, and     moving two fingers apart or together for initiating a zoom-in or a zoom-out action related to the at least one of the elements.

15. The method according to claim 14, wherein the second kind of contact gesture comprises a set of types of gestures relating to selecting control elements displayed on the touch-sensitive I/O display unit and the first kind of contact gesture comprises a different set of types of gestures relating to selecting at least one of graphical and textual elements displayed on the output display unit.

16. The method according to claim 12, comprising graphically displaying a type of gesture for selecting at least one of a graphical and a textual element or using a function related to the element as a visual aid on the output display unit when a user touches the element on the touch-sensitive I/O display unit.

17. The method according to claim 12, comprising displaying an active region of the touch-sensitive area on the touch-sensitive I/O display unit.

18. The method according to claim 12, comprising duplicating information on one of the first and second display units on the other of the first and second display units by an input through the touch-sensitive I/O display.

19. The method according to claim 12, comprising spreading representation of information over the first and second display units by an input through the touch-sensitive I/O display.

20. The method according to claim 12, comprising displaying information on the output display unit and on the touch-sensitive I/O display and manipulating the information on the output display unit by an input through the touch-sensitive I/O display unit.

21. The method according to claim 12, comprising displaying information on the output display unit and on the touch-sensitive I/O display and triggering a process relating to the information on the output display unit by an input through the touch-sensitive I/O display unit.

22. The method according to claim 12, comprising selecting a control element displayed on the touch-sensitive I/O display by an input through the touch-sensitive I/O display unit and, in response to the selection of the control element, displaying information relating to the control element on the output display unit.

\* \* \* \* \*